(12) United States Patent
Hady

(10) Patent No.: US 10,031,845 B2
(45) Date of Patent: Jul. 24, 2018

(54) METHOD AND APPARATUS FOR PROCESSING SEQUENTIAL WRITES TO A BLOCK GROUP OF PHYSICAL BLOCKS IN A MEMORY DEVICE

(71) Applicant: INTEL CORPORATION, Santa Clara, CA (US)

(72) Inventor: Frank T. Hady, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/089,315

(22) Filed: Apr. 1, 2016

(65) Prior Publication Data

US 2017/0286287 A1 Oct. 5, 2017

(51) Int. Cl.
*G06F 12/00* (2006.01)
*G06F 12/02* (2006.01)
*G06F 13/00* (2006.01)
*G06F 13/28* (2006.01)

(52) U.S. Cl.
CPC .. *G06F 12/0246* (2013.01); *G06F 2212/7201* (2013.01); *G06F 2212/7211* (2013.01)

(58) Field of Classification Search
CPC ......... G06F 12/0246; G06F 2212/7211; G06F 2212/7201
See application file for complete search history.

(56) References Cited

U.S. PATENT DOCUMENTS

| | | | |
|---|---|---|---|
| 7,278,001 B2 | 10/2007 | Oshima | |
| 7,509,471 B2 | 3/2009 | Gorobets | |
| 8,452,940 B2 | 5/2013 | Sinclair | |
| 9,026,893 B1* | 5/2015 | Syu | G06F 11/1076 714/773 |
| 2003/0163663 A1* | 8/2003 | Aasheim | G06F 12/0246 711/202 |
| 2005/0144357 A1* | 6/2005 | Sinclair | G06F 12/0246 711/103 |
| 2005/0144361 A1* | 6/2005 | Gonzalez | G06F 12/0246 711/103 |

(Continued)

FOREIGN PATENT DOCUMENTS

KR  20080073499  8/2008

OTHER PUBLICATIONS

U.S. Appl. No. 15/089,333, entitled "Method and Apparatus for Processing Sequential Writes to Portions of an Addressible Unit", invented by F.T. Hady, filed Apr. 1, 2016, 36 pp. [77.342 (Appln)].

(Continued)

*Primary Examiner* — Mark A Giardino, Jr.
(74) *Attorney, Agent, or Firm* — Konrad Raynes Davda & Victor LLP; David W. Victor

(57) ABSTRACT

Provided are an apparatus and method for processing sequential writes to a block group of physical blocks in a memory device. Sequential write data for a plurality of consecutive logical addresses is received and a determination is made of consecutive physical blocks comprising a block group. Each of the physical blocks has data for a plurality of the consecutive logical addresses. The sequential write data is written to consecutive physical data locations having data for the determined consecutive physical blocks of the block group. The block group metadata for the block group is updated.

25 Claims, 7 Drawing Sheets

(56) References Cited

U.S. PATENT DOCUMENTS

| | | |
|---|---|---|
| 2006/0031627 A1 | 2/2006 | Conley |
| 2008/0104309 A1 | 5/2008 | Cheon et al. |
| 2008/0109589 A1 | 5/2008 | Honda |
| 2008/0189490 A1 | 8/2008 | Cheon et al. |
| 2008/0313505 A1* | 12/2008 | Lee ............... G06F 12/0246 714/47.2 |
| 2009/0089482 A1* | 4/2009 | Traister ........... G06F 12/0246 711/103 |
| 2010/0005270 A1 | 1/2010 | Jiang |
| 2010/0082886 A1 | 4/2010 | Kwon et al. |
| 2010/0174853 A1 | 7/2010 | Lee et al. |
| 2011/0246701 A1 | 10/2011 | Kano et al. |
| 2012/0089854 A1 | 4/2012 | Breakstone et al. |
| 2013/0121075 A1* | 5/2013 | Hutchison .......... G11C 11/5628 365/185.11 |
| 2013/0282967 A1 | 10/2013 | Ramanujan |
| 2014/0025864 A1 | 1/2014 | Zhang et al. |
| 2014/0173178 A1 | 6/2014 | Schwartz |

OTHER PUBLICATIONS

International Search Report and Written Opinion for International Application No. PCT/US2017/020532, dated Jun. 8, 2017, 17 pp. [77.341PCT (ISR & WO)].

International Search Report and Written Opinion for International Application No. PCT/US2017/020538, dated Jun. 9, 2017, 14 pp. [77.342PCT (ISR & WO)].

Office Action 1 for U.S. Appl. No. 15/089,333, dated Jul. 7, 2017, 19 pp. [77.342 (OA1)].

US Patent Publication No. 2008/0189490, dated Aug. 7, 2008, is an English Language Equivalent of KR Publication No. 2008-0073499, dated Aug. 11, 2008.

Final Office Action 1 for U.S. Appl. No. 15/089,333, dated Nov. 30, 2017, 19 pp. [77.342 (FOA1)].

Response to Final Office Action 1 for U.S. Appl. No. 15/089,333, dated Feb. 12, 2018, 12 pp. [77.342 (RFOA1)].

Notice of Allowance 1 for U.S. Appl. No. 15/089,333, dated Mar. 1, 2018, 11 pages [77.342 (NOA1)].

* cited by examiner

Physical Block Metadata

Block Group Write Information Instance

US 10,031,845 B2

METHOD AND APPARATUS FOR PROCESSING SEQUENTIAL WRITES TO A BLOCK GROUP OF PHYSICAL BLOCKS IN A MEMORY DEVICE

TECHNICAL FIELD

Embodiments described herein generally relate to an apparatus and method for processing sequential writes to a block group of physical blocks in a memory device.

BACKGROUND

Solid state drives (SSDs) comprised of NAND memory cells may be built to process received write requests to a logical block address (LBA) by using an indirection table to map the LBA address to a physical address. The SSD controller maintains metadata for the physical addresses being written in a separate volatile memory, such as a Dynamic Random Access Memory (DRAM). The SSD controller uses the indirection table to determine the physical data location storing the data for the LBA address and performs a metadata read, followed by writing the data to the physical data location and updating the metadata for the physical data location, such as by incrementing a write count field.

In current SSD systems, metadata and error correction code (ECC) data may be maintained for a block of LBAs. If there is a write to only one or less than all of the LBAs in a block, then the SSD controller performs a read-modify-write for all the LBAs in the block, which involves first reading all the physical data locations in the SSD memory cells to which the LBAs in the block map, modifying the physical data locations having the data for the modified LBAs, and then rewriting the read and modified data for all the LBAs in the block, including those not modified, back to the physical data locations in the SSD.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
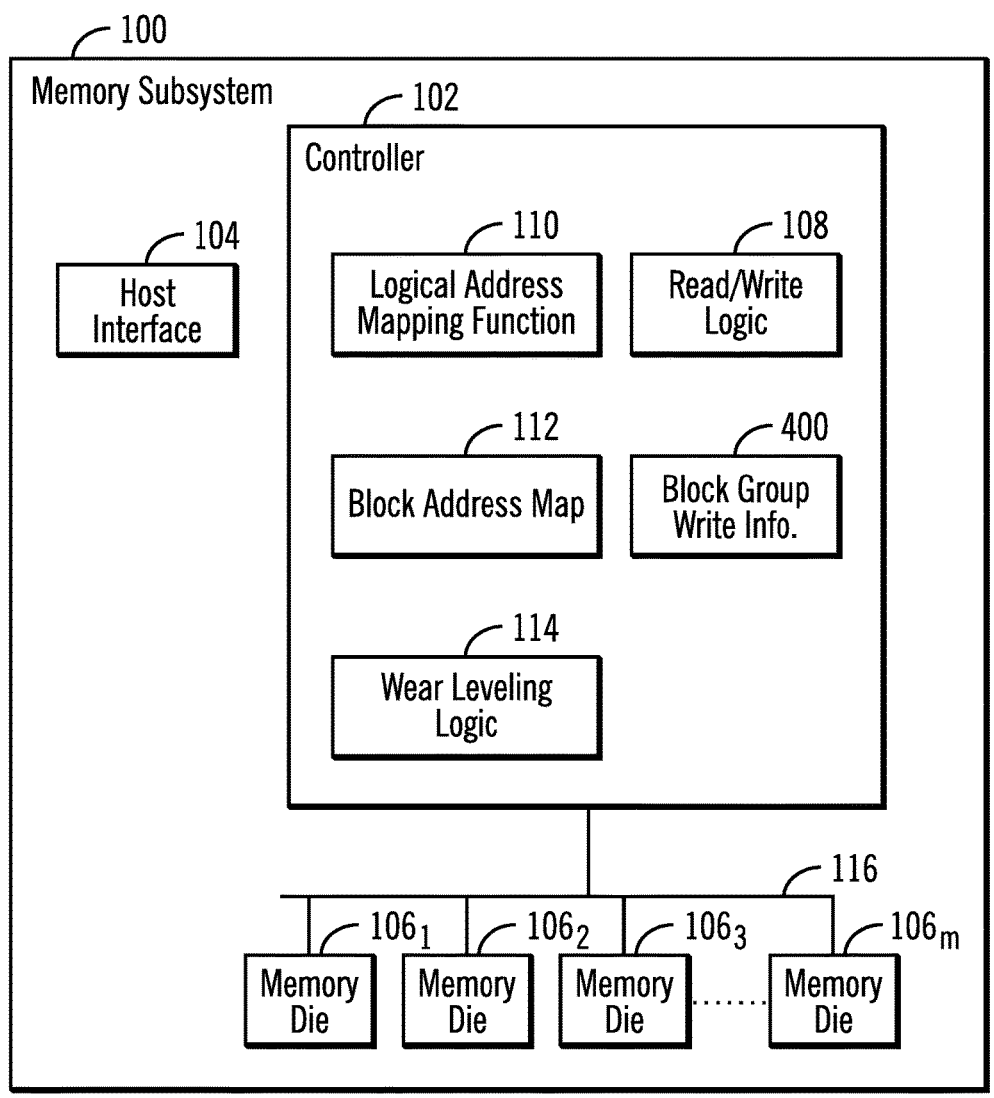
FIG. 1 illustrates an embodiment of a memory subsystem.

Described embodiments provide techniques to process sequential write data to a plurality of consecutive logical addresses for a memory subsystem, such as a non-volatile memory system comprised of non-volatile memory cells. The described embodiments optimize processing of sequential writes by minimizing the number of metadata read and write operations when handling sequential writes to consecutive physical blocks of physical data locations in the memory dies forming the non-volatile memory cells.

With described embodiments a memory controller receives sequential write data for a plurality of consecutive logical addresses. A determination is made of consecutive physical blocks comprising a block group having data for a plurality of the consecutive logical addresses and consecutive physical data locations in the dies having data for the determined physical blocks in the block group. The sequential write data is written to the determined consecutive physical data locations of the physical blocks in the block group. Block group metadata for the block group of physical addresses is updated. The block group metadata may comprise metadata for one of the physical blocks in the block group, so that only metadata for that physical block is read and updated when performing a write operation with respect to all the physical blocks in the block group A further embodiment provides techniques to handle a series of sequential writes to logical addresses of a physical block. Described embodiments process the sequential partial writes by receive an initial write for a logical address. The initial write is written to an initial portion of a physical block having data for a plurality of logical addresses in the memory dies, wherein metadata is provided for the physical block of physical data locations. Upon receiving a next write to the physical block of physical data locations following a previous write comprising one of the initial write and a sequential write to the physical block of physical data locations following the initial write, the next write is written to the physical block of physical data locations sequentially following the previous write in response to the next write being sequential with respect to the previous write. Data other than the next write is written to the physical block of physical data locations following the previous write in response to the next write not being sequential with respect to the previous write.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a memory subsystem 100 including a memory controller 102, a host interface 104 to interface with a host system (not shown), and a plurality of memory dies $106_1, 106_2 \ldots 106_m$ comprising the storage elements that store data at addressable locations. In one embodiment, each die $106_i$ may comprise a plurality of addressable partitions, each having memory addresses. The controller 102 includes read/write logic 108 that manages read and write requests from an attached host (not shown) received through the host interface 104. The controller 102 read/write logic 108 includes a logical address mapping function 110 to map received logical addresses, such as logical block addresses (LBAs), to logical blocks, wherein each logical block is comprised of a plurality of LBAs. A block address map 112 maps the logical blocks to physical block addresses of corresponding physical blocks. Each physical block storing data for multiple LBAs in a logical block is identified by a physical block address (PBA). The logical address mapping function may comprise a math function that maps lower bits, e.g., first 33 bits of a 36 bit LBA, for a block of bytes, such as 512 bytes, to map the logical block to a logical block, such as a block of eight 512 byte LBAs. The upper bits of the LBA, such as bits 34-36, may be used to map the LBA of a logical block of consecutive LBAs for a 512 byte block, e.g., the first 33 bits, to a specific location in the logical block of consecutive LBAs, such as the specific one of eight LBAs in a logical block.

The controller 102 uses a block address map 112 to map a logical block comprised of a plurality of LBAs to a physical block address (PBA) of a physical block, comprised of physical data locations in the memory dies $106_1, 106_2 \ldots 106_m$. Metadata for the physical block maps the physical block to physical data locations in the memory dies $106_1, 106_2 \ldots 106_m$. Consecutive physical blocks may be grouped in a block group, where block group metadata for the consecutive physical blocks in the block group may be maintained in one of the physical blocks of the block group, such as a first physical block in the block group, to manage sequential writes to all the physical blocks of the block group as a write to the entire block group.

The controller 102 may maintain a block group write information instance 400 having information for one of a plurality of active streams of writes to different block groups, each block group comprising consecutive physical blocks that map to consecutive physical data locations in the memory dies $106_1, 106_2 \ldots 106_m$. The block group write information instances $400_i$, manage the different streams for sequential write operations to block groups corresponding to consecutive physical data locations in the memory dies $106_1, 106_2 \ldots 106_m$. The controller 102 has wear leveling logic 114 to move blocks of physical data locations in the memory dies $106_1, 106_2 \ldots 106_m$ to other blocks of physical data locations to move frequently accessed physical data locations to physical data locations that are less frequently written to distribute writes and erasures across the physical data locations in the memory dies $106_1, 106_2 \ldots 106_m$.

The memory controller 102 interfaces with the memory dies $106_1, 106_2 \ldots 106_m$ over a memory interface 116.

In one embodiment, the controller 102 operates on physical blocks of physical data locations as sequential blocks to optimize operations and reduce overhead management by avoiding have to read and update metadata for every physical block of physical data locations by instead performing operations with respect to consecutive physical blocks arranged in block groups. The described embodiments are intended to optimize processing when the host system is grouping logical addresses (LBAs) as a cluster of sequential logical addresses to process as part of a sequential operation, such as a sequential write operation required by the host operating system. For instance, the sequential write operations may be part of log structured array (LSA) writes, where data is written sequential to a LSA file. The controller 102 optimizes sequential write operations from the host by mapping the consecutive logical block address to logical blocks, and then mapping the logical blocks to physical block addresses of physical blocks which are operated on in block groups of consecutive physical blocks, which in turn map to consecutive physical data locations in the memory dies $106_1, 106_2 \ldots 106_m$. This allows the controller 102 to reduce overhead for sequential write operations by managing physical blocks of consecutive physical data locations in the memory dies $106_1, 106_2 \ldots 106_m$ as a single block group so that only one overhead operation for all the physical blocks in the block group is performed instead of performing overhead operations for each of the physical blocks in the block group.

The memory subsystem 100 and memory dies $106_1, 106_2 \ldots 106_m$ may implement a non-volatile memory device such as three-dimensional (3D) crosspoint memory, phase change memory (PCM), memory that incorporates memristor technology, Magnetoresistive random-access memory (MRAM), Spin Transfer Torque (STT)-MRAM, NAND memory cells, ferroelectric random-access memory (Fe-TRAM), nanowire-based non-volatile memory, Resistive Random Access Memory (ReRAM), etc. The memory subsystem 100 may not maintain a separate buffer or dynamic random access memory (DRAM) to store metadata and may instead store the metadata in the memory dies $106_1, 106_2 \ldots 106_m$. Alternatively, metadata may be maintained in a separate memory device in the memory subsystem 100, such as a DRAM.

The controller 102, including the components therein, such as read/write logic 108, logical address mapping function 110, block address map 112, and block group write information 400 may be implemented in an integrated circuit or other hardware device, such as an Application Specific Integrated Circuit (ASIC), Field Programmable Gate Array (FPGA).

Figure 2:
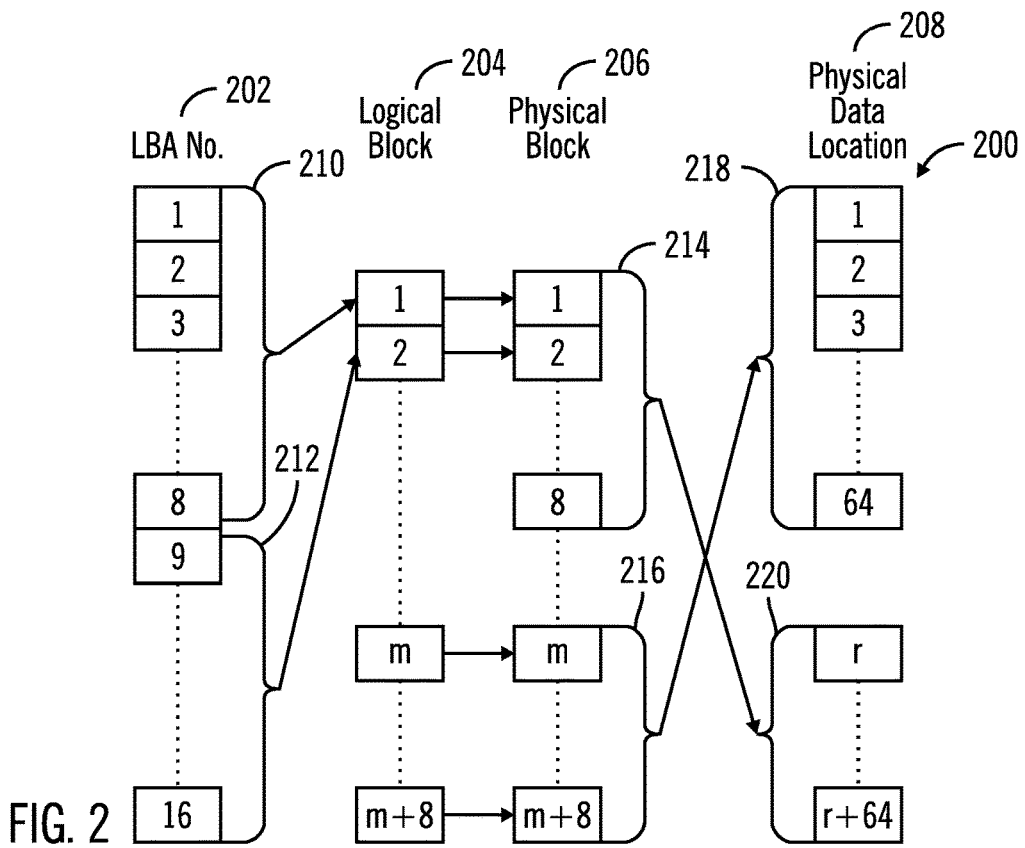
FIG. 2 illustrates an embodiment of a mapping of logical addresses to logical blocks, to physical blocks and to physical data locations in memory dies.

FIG. 2 illustrates a mapping 200 of consecutive logical addresses 202, such as LBAs, map to logical blocks 204, which in turn one-to-one map to physical blocks 206, which map to physical data locations 208 in the memory dies $106_1, 106_2 \ldots 106_m$. For instance, LBAs 1 . . . 16 by way of example, are managed as blocks 210, 212 of consecutive LBAs, LBAs 1-8 and 9-10, respectively, that map to logical blocks 1 and 2 through the logical address mapping function 110. The block address map 112 maps each of the logical blocks 1, 2 . . . m+8 to a corresponding one of the physical blocks 1, 2 . . . m+8, which would be identified by a PBA. The physical blocks 206 may be arranged as block groups of consecutive physical blocks, such as block groups 214, 216 of eight physical blocks, which in turn map to consecutive physical data locations 208 in the memory dies $106_1, 106_2 \ldots 106_m$. Each of the physical blocks 206 in the block groups 214, 216 maps to multiple physical data locations 208.

Upon initialization, the physical blocks 206 in block groups, e.g., 214, 216, map to corresponding consecutive physical data locations 208, e.g., 1, 2, 3 . . . 64, 65-124, respectively, in a first to last ordering. As a result of wear leveling operations, block groups, e.g., 214, 216, of consecutive physical blocks 206 may be moved to different blocks of consecutive physical data locations, such as by moving a block group 214 initially mapping to physical data locations 218 that are frequently written, i.e., hot, to a block of consecutive physical data locations 220, e.g., r . . . r+64, that are not frequently accessed, i.e., cold. As a result of such wear leveling, consecutive block groups of physical blocks may not map to consecutive groups physical data locations 208.

Figure 3:
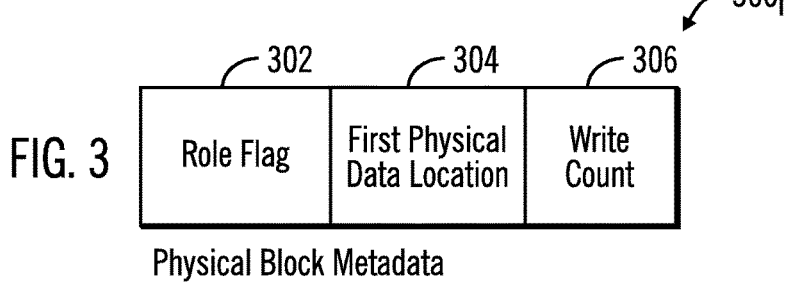
FIG. 3 illustrates an embodiment of physical block metadata for a physical block comprising physical data locations in a memory die.

FIG. 3 illustrates an embodiment of physical block metadata 300$_i$, for each of the physical blocks 206, identified by a PBA, including a role flag 302 indicating whether the physical block metadata also functions as block group metadata for a block group including the physical block, e.g., 214, 216; a first physical data location 304 indicating a first physical data location 208 to which the first data in the physical block is written; and a write count 306 indicating a number of writes that have been performed to each of the physical data locations in the physical block.

When the physical block metadata 300$i$ also comprises the block group metadata for a group of physical blocks, then the first physical data location 304 comprises the first physical data location for the block group and the write count indicates the writes to the block group, or to each of the physical blocks in the block group. In described embodiments, the block metadata for one of the physical blocks in the block group, such as the first physical block, may be used as the metadata for the entire block group, because writes are presumed to occur sequentially to every physical block in the block group. All the data in the physical blocks in a block group 214, 216 may be sequentially written to consecutive physical data locations starting from the first physical data location 304 for the block group.

In the described embodiment of FIG. 3, the physical block metadata 300$_i$, that is used as the block group metadata is indicated as such by the role flag 302. In an alternative embodiment, the role flag 302 may not be used because the memory controller 102 may be programmed to identify a predetermined, e.g., first, physical block of a block group having the block group metadata, using the block group number as an offset into the physical blocks, and the predetermined, e.g., first, physical block of each block group may be determined from the number of physical blocks in each block group and the block group number. In such case, the role flag 302 is not needed because the block group metadata is known to be in the metadata for the predetermined or first physical block of a block group.

The physical block (or block group) metadata 300$_i$ may be stored in regions of the physical data locations 208 dedicated to storing the physical block metadata 300$_i$.

Figure 4:
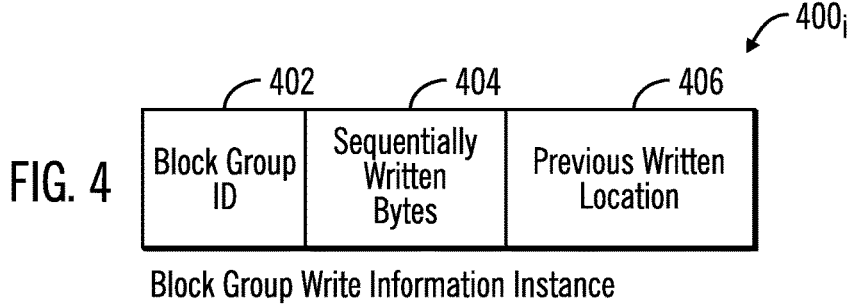
FIG. 4 illustrates an embodiment of a block group write information instance.

FIG. 4 illustrates an embodiment of a block write information instance 400$_i$ for each stream of writes to one of the block groups, a block group identifier, which may comprise an identifier of the first physical block of the block group 402; a number of sequentially written bytes 404 which may be used to determine when all the sequential physical data locations in the physical block 402 have been written; and a previous written location 406 indicating a physical data location last written in the block group 402.

Figure 5:
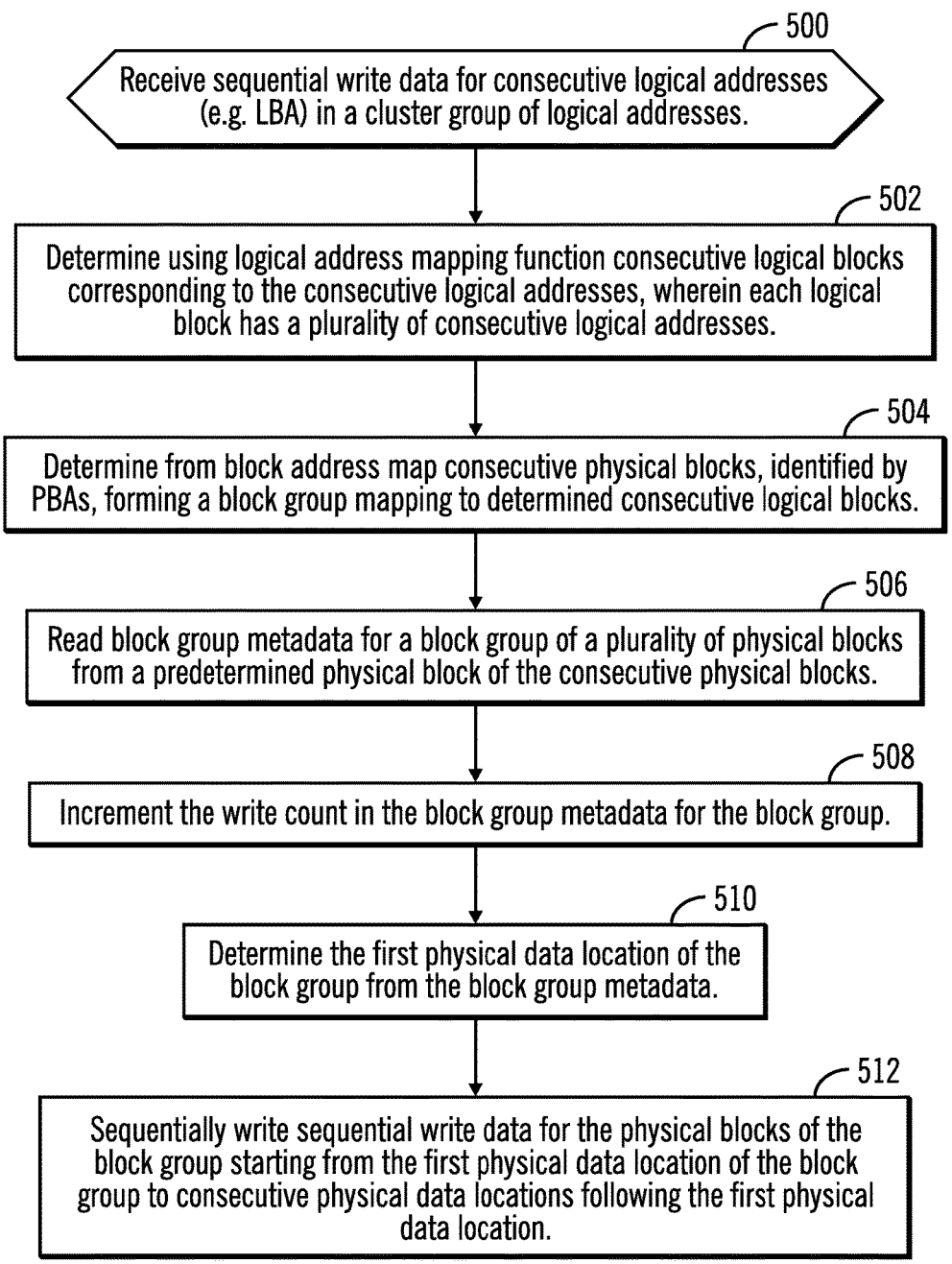
FIG. 5 illustrates an embodiment of operations to process sequential writes to consecutive logical addresses.

FIG. 5 illustrates an embodiment of operations performed by the read/write logic 108 to process sequential write data for consecutive logical addresses, such as in a cluster group of logical addresses 202. The host operating system may write logical addresses sequentially, such as for a log structured array (LSA) or other operations. Upon receiving (at block 500) sequential write data for a block of consecutive logical addresses, e.g., 210, 212, in a cluster group of logical addresses, the read/write logic 108 determines (at block 502), using the logical address mapping function 110, the consecutive logical blocks 204 corresponding to the consecutive logical addresses, where each logical block 204 is comprised of a plurality of logical addresses, e.g., 210, 212. The read/write logic 108 determines (at block 504) from the block address map 112 consecutive physical blocks, identified by PBAs, mapping to the determined consecutive logical blocks that form a block group. The read/write logic 108 reads (at block 506) the block group metadata 300$i$, for the block group comprising the determined physical blocks, which may comprise the physical block metadata 300$i$ for a predetermined, e.g., first, physical block of the block group. The read/write logic 108 increments (at block 508) the write count 306 of the block group metadata 300$i$ of the block group. In one embodiment, only the block group metadata comprising the predetermined physical block metadata 300$_i$ is incremented and the metadata for other physical blocks in the block group is not incremented or updated, thus optimizing metadata operations for block group writes. In an alternative embodiment, the physical block metadata for all other physical blocks in the block group may also be updated without delaying the write in case the physical blocks cease to be managed according to the block group scheme.

The read/write logic 108 determines (at block 510) the first physical data location 304 of the block group from the block group metadata 300$_i$. The sequential write data in the physical blocks of the block group is written (at block 512) to the physical data locations starting from the determined first physical data location of the block group to consecutive physical data locations following the first physical data location. The physical block metadata for physical blocks in the block group following the first physical block may not be read before writing the sequential write data to the consecutive physical data locations in the block group following the first physical data location. In this way writing data to sequential physical blocks is optimized by not having to read the physical block metadata for each physical block being sequentially written to the block group.

With the operations of FIG. 5, only one read and write of the block group metadata 300$i$ is performed for one of the physical blocks of the block group and the data for all the physical blocks other than the predetermined physical block are sequentially written without having to perform further physical block metadata read and writes. This reduction in the number of metadata reads and writes when writing to multiple physical blocks of sequential physical data locations optimizes write operations to a block group of a plurality of consecutive physical blocks.

Figure 6:
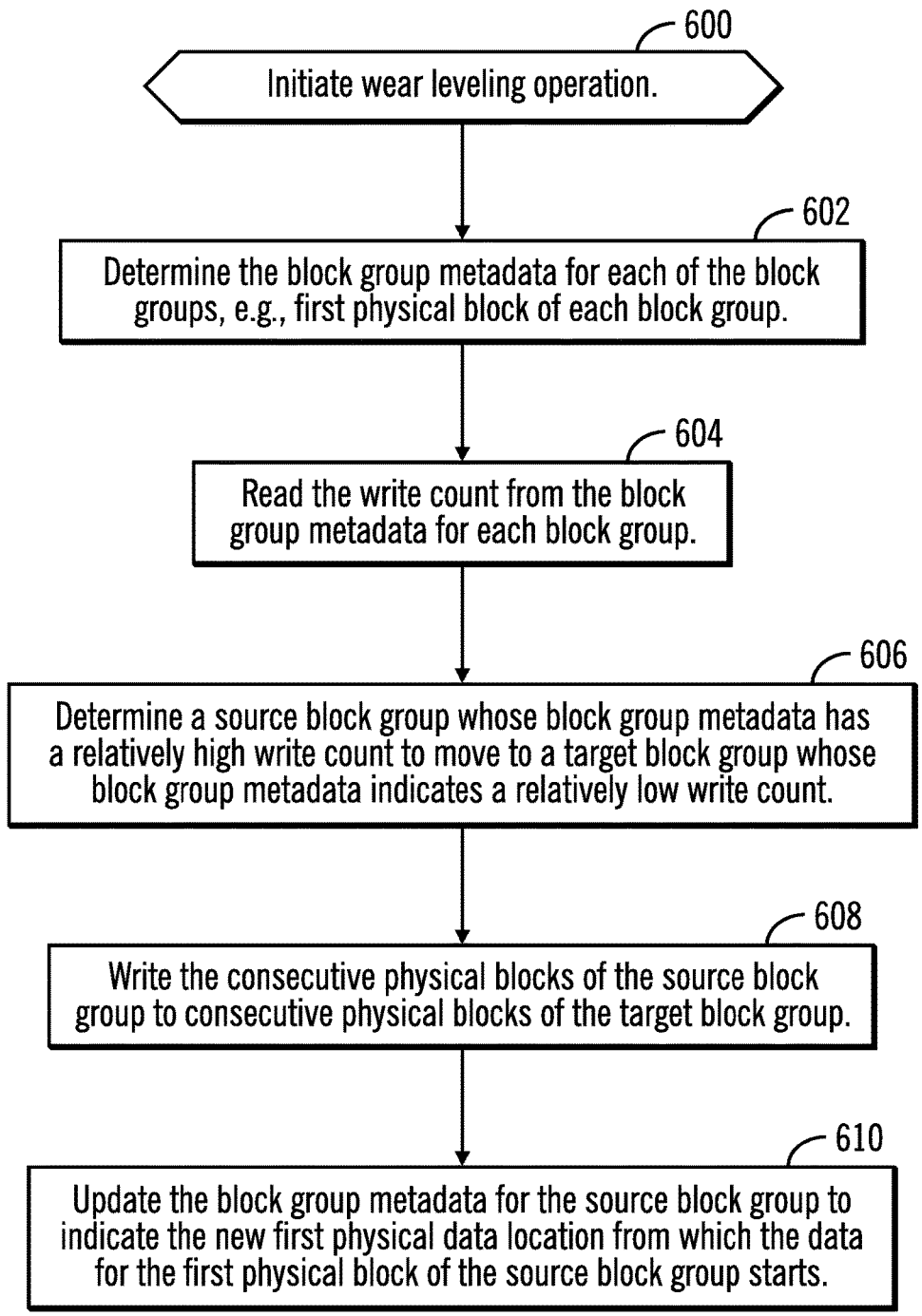
FIG. 6 illustrates an embodiment of operations to perform wear leveling.

FIG. 6 illustrates an embodiment of operations performed by the wear levelling logic 114 to distribute data more frequently written blocks of sequential physical data locations to blocks of sequential physical data locations less frequently written. Upon initiating (at block 600) wear leveling operations, the wear leveling logic 114 determines (at block 602) the block group metadata 300$i$ for each of the block groups, such as by processing the block group metadata for the predetermined, e.g., first, physical block in each block group. The write count 306 is read (at block 604) from the block group metadata 300$_i$ for each of the block groups. The wear leveling logic 114 determines (at block 606) a source block of sequential physical data locations whose block group metadata 300$_S$ has a relatively high write count 306 to move to a target block group whose block group metadata 300$_T$ has a relatively low write count. The consecutive physical blocks of the source block group are written (at block 608) to the consecutive physical blocks of the target block group, which may involve first moving the data for the target block group to different physical data locations. The wear leveling logic 114 updates (at block 610) the first physical data location 304 in the source block group metadata 300$_S$ to indicate the new start physical data location to which the source block group maps. For instance, the first physical data location 304 for the block group 214 may be updated to indicate the physical data location r which is the new first physical data location of the source block group 214 after being moved from physical data locations 218 to 220. In this way, the first physical data location 304 may map a block group of physical blocks to physical data locations different from those assigned in the initial mapping, and consecutive block groups of consecutive physical blocks may not be stored in consecutive groups of physical data locations, as shown in FIG. 2.

With the described embodiments of FIG. 6, a block group of multiple physical blocks, or PBAs, are selected for moving based on reading the block group metadata $300_i$ and write count 306 without having to read and update the write count 306 in the metadata for all of the physical blocks in the block group. This optimizes wear leveling operations because the physical block metadata $300_i$ for only one physical block of a block group needs to be read to determine how to move more frequently written blocks to less frequently written blocks.

Figure 7A:
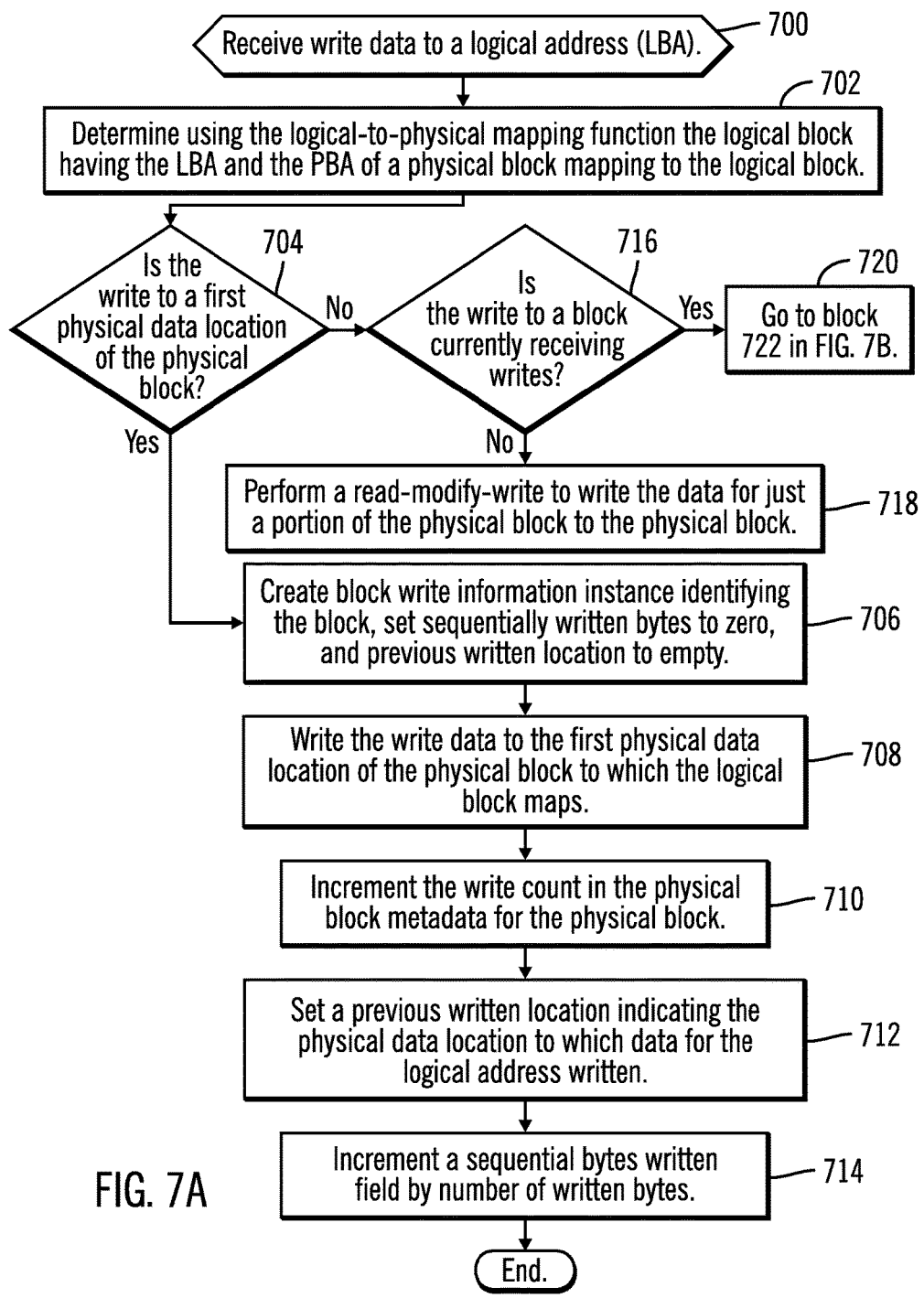
FIGS. 7a and 7b illustrate an embodiment of operations performed to process sequential writes to consecutive logical addresses.
Figure 7B:
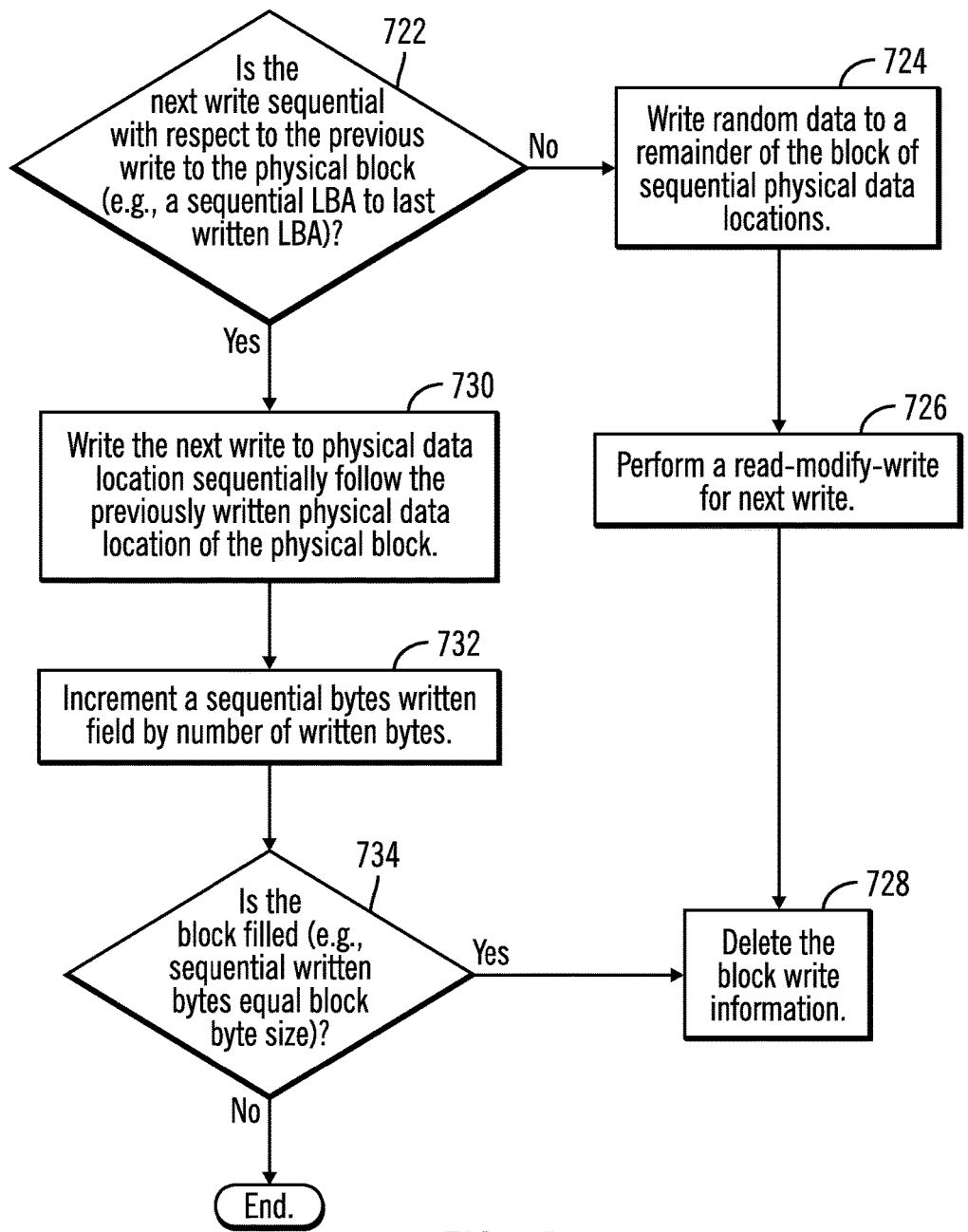

FIGS. 7a and 7b illustrate an embodiment of operations performed by the read/write logic 108 to handle a series of sequential writes to consecutive logical address, such as updates to database records. The operations of FIGS. 7a, 7b are performed whenever a write is started to a new LBA to allow handling of multiple interleaved writes to multiple physical blocks 206. Upon receiving (at block 700) a write to a logical address (LBA), the read/write logic 108 determines (at block 702), using the logical address mapping function 110 and the block address map 112, the logical block to which the LBA maps and a PBA of the physical block 206 mapping to the determined logical block 204. The read/write logic 108 determines (at block 704) whether the write is to a first physical data location 304 of the determined physical block, as indicated in the physical block metadata $300_i$ for the determined physical block.

If (at block 704) the write is to the first physical data location 304 of a physical block, then the read/write logic 108 creates (at block 706) a block write information instance $400_i$ identifying the physical block identifier 402, sets the sequentially written bytes 404 to zero, and sets the previous written location 406 to the first physical data location 304 of the physical block 402. The received write is then written (at block 708) to the first physical data location 304 of the physical block. The write count 306 in the physical block metadata $300_i$ is incremented (at block 710) and the previous written location 406 is set (at block 712) to the physical data location to which the data for the received logical address is written. The number of sequential bytes written 404 is incremented (at block 714) by the number of written bytes, e.g., 512 bytes. If each logical address (LBA) 202 and physical data location 208 comprises 512 bytes, and a physical and logical block comprises eight logical addresses, then the physical block is filled when all the sequential bytes written 404 becomes 4 kilobytes. Control then ends to wait for the next write to the block to process.

If (at block 700) the received write is not to a first physical data location 304 of a physical block of physical data locations, then the read/write logic 108 determines (at block 716) whether the next write is to a physical block currently receiving sequential writes, which may be determined if there is a block write information instance $400_i$ open for the physical block including the data for the logical address (LBA) to which the write is directed. If (at block 716) the write is not to a physical block currently receiving a stream of writes, which means it is a random write because it is also not a write to the first physical data location 304 of the physical block, then the read/write logic 108 performs (at block 718) a read-modify-write to write the received write to the physical block to which the logical address of the received write maps. The read-modify write may involve reading the entire physical block of consecutive physical data locations having data for consecutive LBAs including the received LBA, modifying the physical data location with the received write data for the received LBA, and then writing back the read and modified data for all the physical data locations in the physical block. If (at block 716) the write is to a physical block currently receiving streamed sequential writes, then control proceeds (at block 720) to block 722 in FIG. 7b.

The read/write logic 108 determines (at block 722) whether the next write is sequential with respect to the previous write to the physical block, or to a location following the indicated previous written location 406 in the block write information instance 400—such as a previously written physical data location or logical address (LBA). If (from the no branch of block 722) the received new write is not sequential with respect to the last written write, or following the previous written location 406, then random data is written (at block 724) to the remainder of the physical block of sequential physical data locations. The read/write logic 108 may then perform (at block 726) a read-modify-write for the received next write. The block write information instance $400_i$ may then be deleted (at block 728)

If (from the yes branch of block 722) the received next write is sequential with respect to the previous write, e.g., previous written location 406, then the next write is written (at block 730) to physical data locations 208 sequentially following the previous written location 406 of the physical block 402. The number of sequential bytes written 404 is incremented (at block 732) by the number of written bytes, e.g., 512 bytes. If (at block 734) the block is now filled, which may be determined when the sequential written bytes 404 equals the physical block size, then control ends, and the block write information instance $400_i$ may be deleted (at block 728). If (at block 730) the block is not filled, then control end and waits for the next write.

With the embodiments of FIGS. 7a and 7b, sequential writes to logical addresses that are portions of a larger physical block may sequentially occur so as to avoid having to perform a read-modify-write upon each partial sequential write to a portion of a physical block having data for multiple LBAs by allowing the physical block of physical data locations to fill as long as partial sequential writes are received until the block is filled. This reduces the wear for NVRAM devices by avoiding having to perform continuous read-modify-writes for each single LBA write and optimizes performance by avoiding the delays causes by a read-modify write, which requires a read and write to the entire physical block having data for multiple LBAs. Further, if the benefits of sequential write processing cannot be realized upon receiving a random write, then the sequential write operations cease, and a read-modify-write is performed for the new random write. Yet further, the embodiments of FIGS. 7a and 7b reduce metadata processing overhead because the metadata 300—such as the write count 306, is only updated upon writing to the first physical data location of a physical block having data for multiple LBAs, and not when writing data for subsequent LBAs that map to physical data locations following the first physical data location of the physical block.

Further, the operations of FIGS. 7a and 7b may be performed for a plurality of interleaved write streams to different physical blocks without the need to buffer and detect the sequential streams. With the described embodiments, when a write is received for one of the pending write streams concurrently writing data for logical addresses to physical blocks of physical data locations, then the controller will write sequentially following the last physical data location written in the physical block.

In the embodiment of FIGS. 7a and 7b, writes are to LBAs, or logical addresses 202, that map to physical data locations in one physical block of physical data locations having data for a logical block 204 comprising multiple logical addresses (LBAs) 202. In an alternative embodiment, the write can be to different portions of an addressable unit. For instance, in a further embodiment, the initial write is to an addressable unit and written to an initial portion of portions of the addressable unit, wherein metadata is provided for the addressable unit. A next write may be to a next portion of the addressable unit following a previous write to a previous portion. The next write is written to the next portion of the addressable unit sequentially following the previous portion if the next portion is sequential with respect to the previous written portion. Otherwise, data other than the next write is written to a remainder of portions of the addressable unit following the previous portion if the next write is not sequential with respect to the previous write.

For instance, the addressable unit may comprise an LBA and the portions comprise addressable sections of the LBA, and the writes are to the addressable sections of or portions of the LBA. In a further embodiment, the addressable unit may comprise a block group and the portions comprise physical blocks in the block group comprised of physical data locations, wherein each write is to consecutive logical addresses that map to a PBA for one of the physical blocks in the block group. In the embodiment described with respect to FIGS. 7a and 7b, the addressable unit comprises a physical block and the portions comprise the physical data locations to which a write to a logical address maps in the physical block.

In the embodiment where the addressable unit is a block group and each of the portions a physical block, the operations of FIGS. 7a and 7b may be performed for writes to consecutive LBAs 202 that map to the PBA for one physical block 206 in a block group, and the determination may be made with respect to separate writes to the physical blocks of a block group, such that if a write is to a physical block that is not sequential with respect to the last written physical block of the block group, then a read-modify-write may be performed for the entire block group, or all the physical blocks 206 in the block group.

In the embodiment where the addressable unit is an LBA and the portion is an addressable portion of the LBA, and the operations of FIGS. 7a and 7b may be performed for sequential writes to portions of an LBA, and the determination may be made with respect to separate writes to the portions of the LBA, such that if a write is to a portion of an LBA not consecutive with respect to the last written portion of the LBA, then a read-modify-write may be performed for the entire LBA.

In further embodiments, the data in the physical block of physical data locations may be encrypted, and the encryption may be able to handle encryption of interleaved writes to different physical data blocks as long as the writes to one of the physical blocks remain sequential. In such case, the encryption can continue with sequential writes to the physical block, but if a write is received to the physical block that is not sequential with respect to the previously written physical data location of the block, then the read-modify-write and encryption is performed with respect to the entire physical block so that all the data of the physical block may be encrypted with the read-modify-write.

Figure 8:
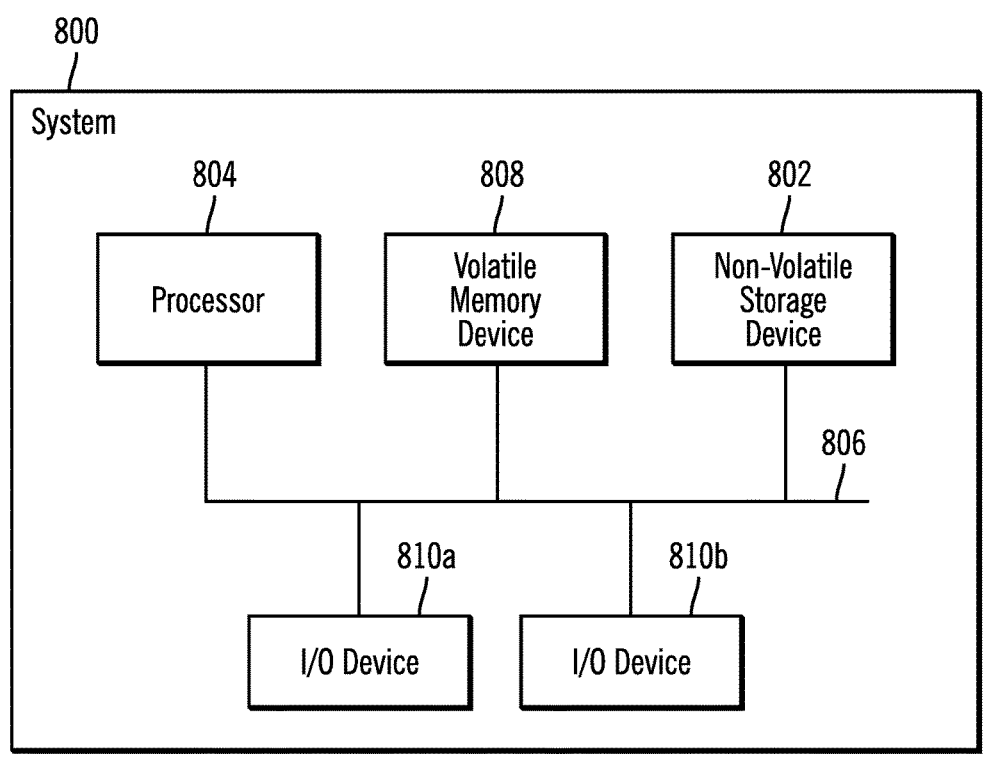
FIG. 8 illustrates an embodiment of a system in which a memory subsystem of the described embodiments may be deployed.

FIG. 8 illustrates an embodiment of a computer system 800 implementation in which the memory subsystem 100 of FIG. 1 may be deployed as a non-volatile storage device 802. The computer system 800 includes a processor 804 that communicates over a bus 906 with a volatile memory device 908, in which programs, operands and parameters, being executed are cached and the non-volatile storage device 802, in which data and programs may be stored. The processor 804 may also communicate with Input/Output (I/O) devices 810a, 810b, which may comprise input devices, display devices, graphics cards, ports, network interfaces, etc. The non-volatile storage device 802 may be mounted to the computer system 800 enclosure, such as in a storage drive bay, or connected to the computer system 800 through a port interface or over the network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the memory controller 102 and the components therein 108, 110, 112,400, may be implemented as a method, apparatus, device, computer program product comprising a computer readable storage medium using standard programming and/or engineering techniques to produce software, firmware, hardware, or any combination thereof. The described operations may be implemented as code or logic maintained in a "computer readable storage medium", which may comprise an integrated circuit device, such as an Application Specific Integrated Circuit (ASIC), to directly execute the functions or where a processor may read and execute the code from the computer storage readable medium. The computer readable storage medium includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

The reference characters used herein, such as i, m, and r, are used herein to denote a variable number of instances of an element, which may represent the same or different values, and may represent the same or different value when used with different or the same elements in different described instances.

Examples

Example 1 is an apparatus for processing sequential writes to a block group of physical blocks, comprising: memory dies to store data in addressable locations; a controller to perform write operations with respect to the memory dies, to: receive sequential write data for a plurality of consecutive logical addresses; determine consecutive physical blocks comprising a block group, wherein each of the physical blocks has data for a plurality of the consecutive logical addresses; write the sequential write data to consecutive physical data locations having data for the determined consecutive physical blocks of the block group; and update block group metadata for the block group.

In Example 2, the subject matter of Examples 1 and 3-11 can optionally include that the controller is further to: determine consecutive logical blocks corresponding to the consecutive logical addresses, wherein each logical block is comprised of a plurality of consecutive logical addresses; and determine from a block address map the determined consecutive physical blocks corresponding to the determined consecutive logical blocks.

In Example 3, the subject matter of Examples 1, 2 and 4-11 can optionally include that the controller is further to: read the block group metadata for the block group, wherein the write of the sequential write data mapping to the consecutive physical blocks of the block group is performed after reading the block group metadata, wherein metadata for a plurality of the consecutive physical blocks in the block group is not read before writing the sequential write data to the consecutive physical data locations in the block group.

In Example 4, the subject matter of Examples 1-3 and 5-11 can optionally include that the controller is further to: indicate in the metadata for a first physical block of the consecutive physical blocks in the block group that the metadata for the first physical block comprises the block group metadata for the block group; and indicate in the metadata for the physical blocks in the block group following the first physical block that the metadata for the physical blocks do not comprise the block group metadata.

In Example 5, the subject matter of Examples 1-4 and 6-11 can optionally include that there is metadata for each of the physical blocks of the block group, wherein the block group metadata comprises the metadata for a predetermined physical block of the physical blocks in the block group, wherein the metadata for the physical blocks other than the predetermined physical block are not updated when writing the sequential write data to the physical blocks in the block group.

In Example 6, the subject matter of Examples 1-5 and 7-11 can optionally include that the controller is programmed to identify each of the block groups as starting at a fixed offset in the physical data locations based on a mapping of a first physical block of the block group to a corresponding first physical data location of the block group.

In Example 7, the subject matter of Examples 1-6 and 8-11 can optionally include that the controller is further to: determine to move a source block group of consecutive physical blocks mapping to consecutive physical data locations to a target block group of consecutive physical blocks mapping to consecutive physical data locations non-overlapping with the consecutive physical data locations of the source block group; write each of the consecutive physical data locations of the source block group to consecutive physical data locations of the target block group; and update information to map the source block group to the physical data locations of the target block group.

In Example 8, the subject matter of Examples 1-7 and 9-11 can optionally include that the updating of the information to map the source block group comprises updating the block group metadata for the source block group to indicate that the data for the source block group maps to the consecutive physical data locations of the target block group.

In Example 9, the subject matter of Examples 1-8, 10, and 11 can optionally include that the determining to move the source block group of consecutive physical blocks is performed as part of a wear levelling operation to move the source block group of consecutive physical blocks that have a relatively high number of accesses to the target block group of consecutive physical blocks having a relatively low number of read accesses.

In Example 10, the subject matter of Examples 1-9 and 11 can optionally include that the controller is further to: update the block group metadata to increment a number of writes for the block group indicating a number of writes to each of the consecutive physical blocks in the block group in response to a write of the sequential write data to one of the physical blocks of the block group; and use the number of writes indicated in the block group metadata to determine whether to move the data in the block group to a target block group of non-overlapping consecutive physical data locations as part of a wear leveling operation.

In Example 11, the subject matter of Examples 1-10 can optionally include that the consecutive physical data locations in the block group are spread across multiple of the memory dies.

Example 12 is a system for processing sequential writes to a block group of physical blocks, comprising: a processor; a bus interface; and a memory subsystem coupled to the bus to which the processor reads and write data, comprising: memory dies to store data in addressable locations; a controller to perform write operations with respect to the memory dies, to: receive sequential write data for a plurality of consecutive logical addresses; determine consecutive physical blocks comprising a block group, wherein each of the physical blocks has data for a plurality of the consecutive logical addresses; write the sequential write data to consecutive physical data locations having data for the determined consecutive physical blocks of the block group; and update block group metadata for the block group.

In Example 13, the subject matter of Examples 12 and 14-18 can optionally include that the controller is further to: read the block group metadata for the block group, wherein the write of the sequential write data mapping to the consecutive physical blocks of the block group is performed after reading the block group metadata, wherein metadata for a plurality of the consecutive physical blocks in the block group is not read before writing the sequential write data to the consecutive physical data locations in the block group.

In Example 14, the subject matter of Examples 12, 13 and 15-18 can optionally include that there is metadata for each of the physical blocks of the block group, wherein the block group metadata comprises the metadata for a predetermined physical block of the physical blocks in the block group, wherein the metadata for the physical blocks other than the predetermined physical block are not updated when writing the sequential write data to the physical blocks in the block group.

In Example 15, the subject matter of Examples 12-14 and 16-18 can optionally include that the controller is further to: determine to move a source block group of consecutive physical blocks mapping to consecutive physical data locations to a target block group of consecutive physical blocks mapping to consecutive physical data locations non-overlapping with the consecutive physical data locations of the source block group; write each of the consecutive physical data locations of the source block group to consecutive physical data locations of the target block group; and update information to map the source block group to the physical data locations of the target block group.

In Example 16, the subject matter of Examples 12-15 and 17-18 can optionally include that the updating of the information to map the source block group comprises updating the block group metadata for the source block group to indicate that the data for the source block group maps to the consecutive physical data locations of the target block group.

In Example 17, the subject matter of Examples 12-15 and 18 can optionally include that the determining to move the source block group of consecutive physical blocks is performed as part of a wear levelling operation to move the source block group of consecutive physical blocks that have a relatively high number of accesses to the target block group of consecutive physical blocks having a relatively low number of read accesses.

In Example 18, the subject matter of Examples 12-17 can optionally include that the controller is further to: update the block group metadata to increment a number of writes for the block group indicating a number of writes to each of the consecutive physical blocks in the block group in response to a write of the sequential write data to one of the physical blocks of the block group; and use the number of writes indicated in the block group metadata to determine whether to move the data in the block group to a target block group of non-overlapping consecutive physical data locations as part of a wear leveling operation.

Example 19 is a method for processing sequential writes to a block group of physical blocks with respect to memory dies in a memory subsystem, comprising: receiving sequential write data for a plurality of consecutive logical addresses; determining consecutive physical blocks comprising a block group, wherein each of the physical blocks has data for a plurality of the consecutive logical addresses; writing the sequential write data to consecutive physical data locations having data for the determined consecutive physical blocks of the block group; and updating block group metadata for the block group.

In Example 20, the subject matter of claims 19 and 21-25 can optionally include: reading the block group metadata for the block group, wherein the write of the sequential write data mapping to the consecutive physical blocks of the block group is performed after reading the block group metadata, wherein metadata for a plurality of the consecutive physical blocks in the block group is not read before writing the sequential write data to the consecutive physical data locations in the block group.

In Example 21, the subject matter of claims 19, 20 and 22-25 can optionally include that there is metadata for each of the physical blocks of the block group, wherein the block group metadata comprises the metadata for a predetermined physical block of the physical blocks in the block group, wherein the metadata for the physical blocks other than the predetermined physical block are not updated when writing the sequential write data to the physical blocks in the block group.

In Example 22, the subject matter of claims 19-21 and 23-25 can optionally include determining to move a source block group of consecutive physical blocks mapping to consecutive physical data locations to a target block group of consecutive physical blocks mapping to consecutive physical data locations non-overlapping with the consecutive physical data locations of the source block group; writing each of the consecutive physical data locations of the source block group to consecutive physical data locations of the target block group; and updating information to map the source block group to the physical data locations of the target block group.

In Example 23, the subject matter of claims 19-22 and 24-25 can optionally include that the updating of the information to map the source block group comprises updating the block group metadata for the source block group to indicate that the data for the source block group maps to the consecutive physical data locations of the target block group.

In Example 24, the subject matter of claims 19-23 and 25 can optionally include that the determining to move the source block group of consecutive physical blocks is performed as part of a wear levelling operation to move the source block group of consecutive physical blocks that have a relatively high number of accesses to the target block group of consecutive physical blocks having a relatively low number of read accesses.

In Example 25, the subject matter of claims 19-24 can optionally include updating the block group metadata to increment a number of writes for the block group indicating a number of writes to each of the consecutive physical blocks in the block group in response to a write of the sequential write data to one of the physical blocks of the block group; and using the number of writes indicated in the block group metadata to determine whether to move the data in the block group to a target block group of non-overlapping consecutive physical data locations as part of a wear leveling operation.

Example 26 is a method as claimed in claim 19, and can optionally include at least any one of:

(1) determining consecutive logical blocks corresponding to the consecutive logical addresses, wherein each logical block is comprised of a plurality of consecutive logical addresses; and determining from a block address map the determined consecutive physical blocks corresponding to the determined consecutive logical blocks; and/or (2) reading the block group metadata for the block group, wherein the write of the sequential write data mapping to the consecutive physical blocks of the block group is performed after reading the block group metadata, wherein metadata for a plurality of the consecutive physical blocks in the block group is not read before writing the sequential write data to the consecutive physical data locations in the block group; and/or (3) indicating in the metadata for a first physical block of the consecutive physical blocks in the block group that the metadata for the first physical block comprises the block group metadata for the block group; and/or (4) indicating in the metadata for the physical blocks in the block group following the first physical block that the metadata for the physical blocks do not comprise the block group metadata; and/or (5) wherein there is metadata for each of the physical blocks of the block group, wherein the block group metadata comprises the metadata for a predetermined physical block of the physical blocks in the block group, wherein the metadata for the physical blocks other than the predetermined physical block are not updated when writing the sequential write data to the physical blocks in the block group; and/or (6) wherein the controller is programmed to identify each of the block groups as starting at a fixed offset in the physical data locations based on a mapping of a first physical block of the block group to a corresponding first physical data location of the block group; and/or (7) determining to move a source block group of consecutive physical blocks mapping to consecutive physical data locations to a target block group of consecutive physical blocks mapping to consecutive physical data locations non-overlapping with the consecutive physical data locations of the source block group; writing each of the consecutive physical data locations of the source block group to consecutive physical data locations of the target block group; and updating information to map the source block group to the physical data locations of the target block group; and/or (8) wherein the updating of the information to map the source block group comprises updating the block group metadata for the source block group to indicate that the data for the source block group maps to the consecutive physical data locations of the target block group; and/or (9) wherein the determining to move the source block group of consecutive physical blocks is performed as part of a wear levelling operation to move the source block group of consecutive physical blocks that have a relatively high number of accesses to the target block group of consecutive physical blocks having a relatively low number of read accesses; and/or

(10) updating the block group metadata to increment a number of writes for the block group indicating a number of writes to each of the consecutive physical blocks in the block group in response to a write of the sequential write data to one of the physical blocks of the block group; and using the number of writes indicated in the block group metadata to determine whether to move the data in the block group to a target block group of non-overlapping consecutive physical data locations as part of a wear leveling operation; and/or

(11) wherein the consecutive physical data locations in the block group are spread across multiple of the memory dies.

Example 27 is an apparatus for processing sequential writes to a block group of physical blocks with respect to memory dies in a memory subsystem, comprising: means for receiving sequential write data for a plurality of consecutive logical addresses; means for determining consecutive physical blocks comprising a block group, wherein each of the physical blocks has data for a plurality of the consecutive logical addresses; means for writing the sequential write data to consecutive physical data locations having data for the determined consecutive physical blocks of the block group; and means for updating block group metadata for the block group.

In Example 28, the subject matter of claim 24 can optionally include means for reading the block group metadata for the block group, wherein the write of the sequential write data mapping to the consecutive physical blocks of the block group is performed after reading the block group metadata, wherein metadata for a plurality of the consecutive physical blocks in the block group is not read before writing the sequential write data to the consecutive physical data locations in the block group.

Example 29 is an apparatus comprising means to perform a method as claimed in any preceding claim.

Example 30 is a machine-readable storage including machine-readable instructions, when executed, to implement a method or realize an apparatus or system as claimed in any preceding claim.

What is claimed:
1. An apparatus, comprising:
  memory dies to store data in addressable locations;
  a controller to perform write operations with respect to the memory dies, to:
    receive sequential write data for a plurality of consecutive logical addresses;
    determine consecutive physical blocks comprising a physical block group, wherein each of the consecutive physical blocks has data for a plurality of the consecutive logical addresses;
    write the sequential write data to consecutive physical data locations having data for the determined consecutive physical blocks of the physical block group; and
    update block group metadata for the physical block group, wherein metadata for one physical block of the consecutive physical blocks in the physical block group comprises the block group metadata for the physical block group, and wherein metadata for physical blocks in the physical block group, other than the metadata for the physical block comprising the block group metadata, does not comprise the block group metadata.

2. The apparatus of claim 1, wherein the controller is further to:
  determine consecutive logical blocks corresponding to the consecutive logical addresses, wherein each logical block is comprised of a plurality of consecutive logical addresses; and
  determine from a block address map the determined consecutive physical blocks corresponding to the determined consecutive logical blocks.

3. The apparatus of claim 1, wherein the controller is further to:
  read the block group metadata for the physical block group, wherein the write of the sequential write data mapping to the consecutive physical blocks of the physical block group is performed after reading the block group metadata, wherein metadata for a plurality of the consecutive physical blocks in the physical block group is not read before writing the sequential write data to the consecutive physical data locations in the physical block group.

4. The apparatus of claim 3, wherein the controller is further to:
indicate in metadata for a first physical block of the consecutive physical blocks in the physical block group that the metadata for the first physical block comprises the block group metadata for the physical block group; and
indicate in metadata for the consecutive physical blocks in the physical block group following the first physical block that the metadata does not comprise the block group metadata.

5. The apparatus of claim 1, wherein there is metadata for each of the consecutive physical blocks of the physical block group, wherein the block group metadata comprises the metadata for a predetermined physical block of the consecutive physical blocks in the physical block group, wherein the metadata for the consecutive physical blocks other than the predetermined physical block are not updated when writing the sequential write data to the consecutive physical blocks in the physical block group.

6. The apparatus of claim 1, wherein the controller is programmed to identify each of the physical block groups as starting at a fixed offset in the consecutive physical data locations based on a mapping of a first physical block of the physical block group to a corresponding first physical data location of the physical block group.

7. The apparatus of claim 1, wherein the controller is further to:
determine to move a source physical block group of consecutive physical blocks mapping to consecutive physical data locations to a target physical block group of consecutive physical blocks mapping to consecutive physical data locations non-overlapping with the consecutive physical data locations of the source physical block group;
write each of the consecutive physical data locations of the source physical block group to consecutive physical data locations of the target physical block group; and
update information to map the source physical block group to the consecutive physical data locations of the target physical block group.

8. The apparatus of claim 7, wherein to update the information to map the source physical block group comprises updating the block group metadata for the source physical block group to indicate that the data for the source physical block group maps to the consecutive physical data locations of the target physical block group.

9. The apparatus of claim 7, wherein to move the source physical block group of consecutive physical blocks is performed as part of a wear levelling operation to move the source physical block group of consecutive physical blocks that have a relatively high number of accesses to the target physical block group of consecutive physical blocks having a relatively low number of read accesses.

10. The apparatus of claim 1, wherein the controller is further to:
update the block group metadata to increment a number of writes for the physical block group indicating a number of writes to each of the consecutive physical blocks in the physical block group in response to a write of the sequential write data to one of the consecutive physical blocks of the physical block group; and
use the number of writes indicated in the block group metadata to determine whether to move the data in the physical block group to a target block group of non-overlapping consecutive physical data locations as part of a wear leveling operation.

11. The apparatus of claim 1, wherein the consecutive physical data locations in the physical block group are spread across multiple of the memory dies.

12. A system, comprising,
a processor;
a bus interface; and
a memory subsystem coupled to the bus interface to which the processor reads and write data, comprising:
memory dies to store data in addressable locations;
a controller to perform write operations with respect to the memory dies, to:
receive sequential write data for a plurality of consecutive logical addresses;
determine consecutive physical blocks comprising a physical block group, wherein each of the consecutive physical blocks has data for a plurality of the consecutive logical addresses;
write the sequential write data to consecutive physical data locations having data for the determined consecutive physical blocks of the physical block group; and
update block group metadata for the physical block group, wherein metadata for one physical block of the consecutive physical blocks in the physical block group comprises the block group metadata for the physical block group, and wherein metadata for physical blocks in the physical block group, other than the metadata for the physical block comprising the block group metadata, does not comprise the block group metadata.

13. The system of claim 12, wherein the controller is further to:
read the block group metadata for the physical block group, wherein the write of the sequential write data mapping to the consecutive physical blocks of the physical block group is performed after reading the block group metadata, wherein metadata for a plurality of the consecutive physical blocks in the physical block group is not read before writing the sequential write data to the consecutive physical data locations in the physical block group.

14. The system of claim 12, wherein there is metadata for each of the consecutive physical blocks of the physical block group, wherein the block group metadata comprises the metadata for a predetermined physical block of the consecutive physical blocks in the physical block group, wherein the metadata for the consecutive physical blocks other than the predetermined physical block are not updated when writing the sequential write data to the consecutive physical blocks in the physical block group.

15. The system of claim 12, wherein the controller is further to:
determine to move a source physical block group of consecutive physical blocks mapping to consecutive physical data locations to a target physical block group of consecutive physical blocks mapping to consecutive physical data locations non-overlapping with the consecutive physical data locations of the source physical block group;
write each of the consecutive physical data locations of the source physical block group to consecutive physical data locations of the target physical block group; and update information to map the source physical block group to the consecutive physical data locations of the target physical block group.

16. The system of claim 15, wherein to update the information to map the source physical block group comprises updating the block group metadata for the source physical block group to indicate that the data for the source physical block group maps to the consecutive physical data locations of the target physical block group.

17. The system of claim 15, wherein the determining to move the source physical block group of consecutive physical blocks is performed as part of a wear levelling operation to move the source physical block group of consecutive physical blocks that have a relatively high number of accesses to the target physical block group of consecutive physical blocks having a relatively low number of read accesses.

18. The system of claim 12, wherein the controller is further to:
update the block group metadata to increment a number of writes for the physical block group indicating a number of writes to each of the consecutive physical blocks in the physical block group in response to a write of the sequential write data to one of the consecutive physical blocks of the physical block group; and
use the number of writes indicated in the block group metadata to determine whether to move the data in the physical block group to a target physical block group of non-overlapping consecutive physical data locations as part of a wear leveling operation.

19. A method to perform write operations with respect to memory dies in a memory subsystem, comprising:
receiving sequential write data for a plurality of consecutive logical addresses;
determining consecutive physical blocks comprising a physical block group, wherein each of the consecutive physical blocks has data for a plurality of the consecutive logical addresses;
writing the sequential write data to consecutive physical data locations having data for the determined consecutive physical blocks of the physical block group; and
update block group metadata for the physical block group, wherein metadata for one physical block of the consecutive physical blocks in the physical block group comprises the block group metadata for the physical block group, and wherein metadata for physical blocks in the physical block group, other than the metadata for the physical block comprising the block group metadata, does not comprise the block group metadata.

20. The method of claim 19, further comprising:
reading the block group metadata for the physical block group, wherein the write of the sequential write data mapping to the consecutive physical blocks of the physical block group is performed after reading the block group metadata, wherein metadata for a plurality of the consecutive physical blocks in the physical block group is not read before writing the sequential write data to the consecutive physical data locations in the physical block group.

21. The method of claim 19, wherein there is metadata for each of the consecutive physical blocks of the physical block group, wherein the block group metadata comprises the metadata for a predetermined physical block of the consecutive physical blocks in the physical block group, wherein the metadata for the consecutive physical blocks other than the predetermined physical block are not updated when writing the sequential write data to the consecutive physical blocks in the physical block group.

22. The method of claim 19, further comprising:
determining to move a source physical block group of consecutive physical blocks mapping to consecutive physical data locations to a target physical block group of consecutive physical blocks mapping to consecutive physical data locations non-overlapping with the consecutive physical data locations of the source physical block group;
writing each of the consecutive physical data locations of the source physical block group to consecutive physical data locations of the target physical block group; and
updating information to map the source physical block group to the consecutive physical data locations of the target physical block group.

23. The method of claim 22, wherein the updating of the information to map the source physical block group comprises updating the block group metadata for the source physical block group to indicate that the data for the source physical block group maps to the consecutive physical data locations of the target physical block group.

24. The method of claim 22, wherein the determining to move the source physical block group of consecutive physical blocks is performed as part of a wear levelling operation to move the source physical block group of consecutive physical blocks that have a relatively high number of accesses to the target physical block group of consecutive physical blocks having a relatively low number of read accesses.

25. The method of claim 19, further comprising:
updating the block group metadata to increment a number of writes for the physical block group indicating a number of writes to each of the consecutive physical blocks in the physical block group in response to a write of the sequential write data to one of the consecutive physical blocks of the physical block group; and
using the number of writes indicated in the block group metadata to determine whether to move the data in the physical block group to a target physical block group of non-overlapping consecutive physical data locations as part of a wear leveling operation.

* * * * *